US011615056B2

United States Patent
Cimbál (10) Patent No.: US 11,615,056 B2
(45) Date of Patent: Mar. 28, 2023

(54) COMPRESSION OF ARRAY OF STRINGS WITH SIMILARITIES

(71) Applicant: Avast Software s.r.o., Prague (CZ)

(72) Inventor: Pavel Cimbál, Turnov (CZ)

(73) Assignee: Avast Software s.r.o., Prague (CZ)

( * ) Notice: Subject to any disclaimer, the term of this patent is extended or adjusted under 35 U.S.C. 154(b) by 479 days.

(21) Appl. No.: 16/586,400

(22) Filed: Sep. 27, 2019

(65) Prior Publication Data
US 2021/0097029 A1   Apr. 1, 2021

(51) Int. Cl.
*G06F 16/174* (2019.01)
*G06F 21/56* (2013.01)

(52) U.S. Cl.
CPC ........ *G06F 16/1744* (2019.01); *G06F 21/568* (2013.01)

(58) Field of Classification Search
CPC .......................... G06F 16/1744; G06F 21/586
See application file for complete search history.

(56) References Cited

U.S. PATENT DOCUMENTS

| | | | | |
|---|---|---|---|---|
| 7,574,719 B1* | 8/2009 | Shield | ................ | H04N 21/2362 725/39 |
| 2001/0051941 A1* | 12/2001 | Tonomura | ................ | H03M 7/30 |
| 2002/0057213 A1* | 5/2002 | Heath | ................ | H03M 7/3088 341/51 |
| 2002/0059462 A1* | 5/2002 | Hannu | ................ | H04L 69/04 709/247 |
| 2002/0196166 A1* | 12/2002 | Satoh | ................ | H03M 7/3084 382/229 |
| 2005/0219075 A1* | 10/2005 | Storer | ................ | H03M 7/30 341/51 |
| 2007/0240200 A1* | 10/2007 | Han | ................ | G06F 21/10 726/2 |
| 2009/0259675 A1* | 10/2009 | Hamilton | ............ | G06F 16/1744 |
| 2016/0204796 A1* | 7/2016 | Burukhin | ............. | G06F 40/242 341/51 |
| 2017/0295263 A1* | 10/2017 | Francis | ............... | G06F 16/1744 |

OTHER PUBLICATIONS

Maly, Kurt, Compressed Tries, Communications of the ACM, Jul. 1976, pp. 409-415, vol. 19, Issue 7, Association for Computing Machinery.

(Continued)

*Primary Examiner* — Jensen Hu
(74) *Attorney, Agent, or Firm* — Avek IP, LLC; William B. Kircher (57) ABSTRACT

A method of compressing a string array comprising strings with similarity includes selecting a string compression method from among a plurality of available compression methods based on at least which of the available compression method yields the shortest compressed string. The string is then compressed using the selected string compression method. The array of strings to be compressed comprises text characters represented by a first range of values within a word, and compressed string comprises one or more words in a second range of values dedicated to compression and not overlapping with the first range of values. This process is repeated for additional strings in the string array, such that the compression method used for each of a plurality of strings is independently selected.

14 Claims, 5 Drawing Sheets

(56) References Cited

OTHER PUBLICATIONS

C-trie, https://web.archive.org/web/20190630065123/https://en.wikipedia.org/wiki/C-trie, 1 page. Accessed Dec. 31, 2019.
LZ77 and LZ78, https://web.archive.org/web/20190919023911/https://en.wikipedia.org/wiki/LZ77_and_LZ78, 5 pages. Accessed Dec. 31, 2019.
Radix tree, https://web.archive.org/web/20190925195158/https://en.wikipedia.org/wiki/Radix_tree, 7 pages. Accessed Dec. 31, 2019.
Trie, https://web.archive.org/web/20190926020211/https://en.wikipedia.org/wiki/Trie, 7 pages. Accessed Dec. 31, 2019.

* cited by examiner

Input strings (96B including terminating zeroes & excluding 110_DummyC):
| | |
|---|---|
| File | 46 69 6C 65 00 |
| Virus-A | 56 69 72 75 73 2D 41 00 |
| Virus-C | 56 69 72 75 73 2D 43 00 |
| Virus-DX | 56 69 72 75 73 2D 44 58 00 |
| Virus-Bee | 56 69 72 75 73 2D 42 65 65 00 |
| Virago | 56 69 72 61 67 6F 00 |
| 110_DummyC | <100 arbitrary padding characters follow here> |
| Filament | 46 69 6C 61 6D 65 6E 74 00 |
| FilaDog | 46 69 6C 61 44 6F 67 00 |
| Virus-DX9 | 56 69 72 75 73 2D 44 58 39 00 |
| Virus-DXTreme | 56 69 72 75 73 2D 44 58 54 72 65 6D 65 00 |
| Filemon | 46 69 6C 65 6D 6F 6E 00 |

Compressed Strings (H=30, 48B, not counting bytes belonging to 110_DummyC):
| | | | |
|---|---|---|---|
| 00 46 69 6C 65 | Terminator | + "File" | (~ File) |
| 00 56 69 72 75 73 2D 41 | Terminator | + "Virus-A" | (~ Virus-A) |
| 02 | Drift_+2 | from Virus-A | (~ Virus-C) |
| 01 58 | Drift_+1 | + "X" from Virus-C | (~ Virus-DX) |
| F8 42 65 65 | Pointer_-8 | + "Bee" to Virus- @0B | (~ Virus-Bee) |
| F4 61 67 6F | Pointer_-12 | + "ago" to Vir @08 | (~ Virago) |
| 00 31 31 30 ... | (excluded 111 characters in total, belonging to 110_DummyC) | | |
| FC 1F 61 6D 65 6E 74 | ExtPtr_-133 | + "ament" to Fil @03 | (~ Filament) |
| F8 44 6F 67 | Pointer_-8 | + "Dog" to Fil @89 | (~ FilaDog) |
| FD 1F 39 | ExtPtr_-132 | + "9" to Virus-DX @0F | (~ Virus-DX9) |
| 1B 72 65 6D 65 | Drift_+27 | + "reme" from Virus-DX9 | (~ Virus-DXTreme) |
| EE 1F 65 6D 6F 6E | ExtPtr_-151 | + "emon" to File @04 | (~ Filemon) |

COMPRESSION OF ARRAY OF STRINGS WITH SIMILARITIES

FIELD

The invention relates generally to compression of computer data, and more specifically to compression of an array of strings with similarities.

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users to attempt to communicate with other users' computers in a manner that poses a danger. For example, a hacker may attempt to log in to a corporate computer to steal, delete, or change information. Computer viruses or Trojan horse programs may be distributed to other computers or unknowingly downloaded such as through email, download links, or smartphone apps. Ransomware may encrypt a user's files and keep them encrypted and unusable until a ransom is paid, and cryptocurrency miners may use another's computing resources to mine cryptocurrency for profit. Further, computer users within an organization such as a corporation may on occasion attempt to perform unauthorized network communications or perform other functions, such as running file sharing programs or mining cryptocurrency using the corporation's computing resources and power.

Computer owners and administrators combat these threats with antivirus or anti-malware software, which in various examples searches data stored in a computer's memory, on its nonvolatile storage, and communicated over its network connections. The antivirus software checks for viruses and malware in part by using signatures or characteristics of known viruses and malware stored in a database, and comparing the signatures with data in the computer system to identify potentially malicious software code. But, as the volume of viruses and other malware increase over time, storage of the virus signatures or characteristics can take an ever-increasing amount of space on the computer's nonvolatile storage when the antivirus software is installed and in the computer's volatile memory when the antivirus software is running. For reasons such as these, it is often desirable to manage or reduce the size of data sets such as a database of virus or other malware signatures.

SUMMARY

One example embodiment of the invention comprises a method of compressing a string array comprising strings with similarity. The array of strings to be compressed comprises text characters represented by a range of values within a word, and a string compression method is selected from among a plurality of available compression methods based on at least which of the available compression method yields the shortest compressed string. The string is then compressed using the selected string compression method, the compressed string comprising one or more words in a second range of values dedicated to compression and not overlapping with the first range of values. This process is repeated for additional strings in the string array, such that the compression method used for each of a plurality of strings is independently selected.

In a another example, the range of values comprises a first range reserved for ASCII printable characters, and two or more additional ranges reserved to indicate different compression methods from among the plurality of available compression methods. In a further example, the value of the word selected in each of the additional ranges reserved to indicate the selected compression method further indicates one or more parameters of the compression applied to the string.

In another example, the compression methods comprise literal (or uncompressed string) compression, drift compression in which the value of a word in the string being compressed varies by a specified drift amount from a prior string, and pointer compression in which the string being compressed includes words also in a prior string up to the point in the prior string indicated by the pointer compression word value. In a further example, the compression methods further comprise extended pointer compression, in which an additional word from an extended pointer compression range of values is used to expand the available range of the pointer used to point to a word in a prior string.

The details of one or more examples of the invention are set forth in the accompanying drawings and the description below. Other features and advantages will be apparent from the description and drawings, and from the claims.

DETAILED DESCRIPTION

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices become more ingrained into our daily lives, the value of the information they store, the data such as passwords and financial accounts they capture, and even their computing power becomes a tempting target for criminals. Hackers regularly attempt to log in to a corporate computer to steal, delete, or change information, or to encrypt the information and hold it for ransom via "ransomware." Malware containing cryptocurrency mining software uses computing resources and power from other people's computers to mine for cryptocurrency. Smartphone apps, Microsoft Word documents containing macros, Java applets, and other such common documents are all frequently infected with malware of various types, and users rely on tools such as antivirus software, firewalls, or other malware protection tools to protect their computerized devices from harm.

Many computerize devices such as home computers, smart phones, and servers therefore employ malware or virus protection in the form of antivirus software, which performs functions such as scanning newly-received data, volatile memory, and storage on the device for malicious code. This is performed in many examples by looking for signatures or known characteristics of malicious software, using a database of signature information that can be updated regularly to recognize new threats.

But, as the number of different threats continues to grow, and malicious coders change or tweak malicious code to perform new functions or avoid detection, the number of threats that are logged in a typical virus database employed by antivirus software grows larger. Modern antivirus databases are often in the hundreds of megabytes in size, taking significant space both in nonvolatile storage where the antivirus software is stored and in memory when the antivirus software is running. Because most antivirus software is running in the background at all times, the resource load this places on a computer with limited memory can be significant.

Some example embodiments presented herein therefore comprise a method of compressing an array of strings such as antivirus names in an antivirus database, including selecting a compression method for each of a plurality of strings in the antivirus database based on which available compression method yields the smallest result. The compressed data comprises a first wordspace such as printable ASCII text characters, and at least one second wordspace not overlapping the first wordspace is used to indicate which compression method is applied and to provide other information regarding parameters used by some compression methods.

In a more detailed example, the wordspace of characters to be compressed is the ASCII printable characters from 20-7F. The wordspaces in this example comprises a byte, which is eight bits and is often represented by two hexadecimal characters, but in other examples comprises words of other lengths. Wordspaces from 00-FF and from 00-1F are used in this example to indicate various compression methods and their parameters, including in various examples use of pointer compression, drift compression, and literal (or uncompressed) string compression as explained in greater detail herein.

Figure 1:
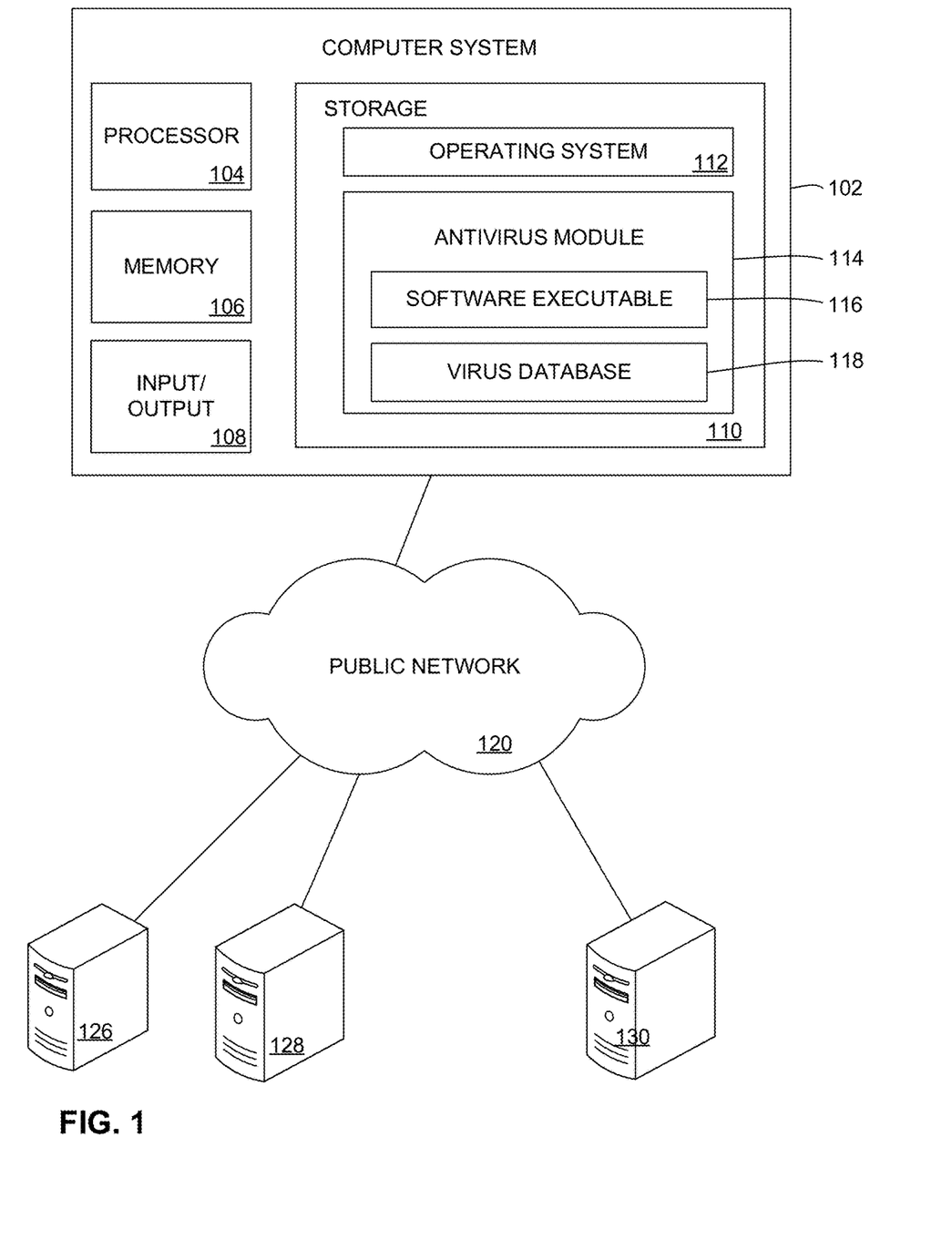
FIG. 1 shows a computer system employing a virus database having compressed character strings, consistent with an example embodiment.

FIG. 1 shows a computer system employing a virus database having compressed character strings, consistent with an example embodiment. Here, a computer system 102 includes a processor 104 operable to execute computer instructions, a memory 106 operable to store computer instructions for execution and other computer data while the computer is running, and input/output 108 operable to exchange data with other devices such as peripherals and other computer systems. Storage 110 stores data that is retained when the power is turned off, such as an installed operating system 112 and software such as antivirus module 114.

The antivirus module in this example includes a software executable module 116 that is operable to search nonvolatile storage and memory for known or suspected threats using signatures and heuristic information stored in a virus database 118. Because the number of threats such as various viruses, Trojans, ransomware, rootkits, and other such threats that may be harmful to the computer system 102, or that may be undesirable such as adware, cryptocurrency miners, and other such undesired software, the size of the virus database can be very large (often hundreds of megabytes) and continues to grow. Efficient compression of the virus database to reduce the amount of space it takes in memory and in nonvolatile storage is therefore desirable, to help reduce the impact that antivirus software has on the computer system 102's resources.

In the example of FIG. 1, the computer system 102 is coupled to a public network 120 such as the Internet, which enables the client computer system to communicate with remote computers such as 126-128, such as to browse Internet web pages hosted by such remote computers, to download software, or to communicate other data. The computer system in this example is also operable to communicate with a remote antivirus service provider 130 that provides in various embodiments up-to-date information such as an updated virus database 118. Managing the size of virus database 118 can therefore also reduce the burden on server 130 and public network 120 in updating many remote copies of the virus database on client computers over the public network.

In operation, the user or administrator of the computer system 102 obtains antivirus software, such as by downloading it from a public network 120 such as the Internet or by obtaining the software encoded on a CD, DVD, flash drive, or other nonvolatile storage. The software is installed on the nonvolatile storage 110 of the computer system 102, and an antivirus software executable program 116 generally runs whenever the computer's operating system 112 is running to provide continuous protection from threats such as viruses and malware. The installed antivirus module 114 includes a virus database 118 that is installed with the antivirus software executable, and that is loaded into memory to compare against executable code found in nonvolatile storage 110 and memory 106 of the computer system to provide protection. As new viruses and other malware are discovered, the antivirus software executable 116 checks for updated virus database information by communicating with the antivirus software provider's server 130. The server 130 distributes updated antivirus database information to many different client computer systems such as 103 that are running the antivirus software, including a set of virus names and associated virus signature information. The computer system 102 then stores the updated virus database in place of virus database 118, using the updated virus database to search for and identify malicious code on the computer system.

The virus database 118 comprises many named virus entries that are variants of similar viruses, and have substantially similar names. This means that patterns within the names of viruses often repeat many times or have simple or minor differences, typically with the similarities in the first part of the name string and the differences being minor changes or additions/subtractions to the end of the string. Patterns such as these lend themselves well to compression by representing the repeating portion of strings using a less lengthy encoding, and different types of change between a string being compressed and a string used as a reference lend themselves to different types of compression to produce the best results.

Some examples presented herein therefore apply one of a plurality of available compression algorithms to a name string, selecting the compression algorithm based on which of the plurality of algorithms produces the best compression. If two or more compression algorithms compress the string being compressed to the same length encoded or compressed sequence, the algorithm or method requiring the least computation or that is the least complex is selected. Details of examples of suitable compression algorithms are provided in the examples below. Although the examples presented here use virus names as input strings, compression methods such as those described in the examples presented here are similarly applicable to other character strings where repetition is common, and especially where repetition at the beginning of strings is expected, such as names, file paths, URLs, logs, timestamps, dictionaries, and the like.

Figure 2:
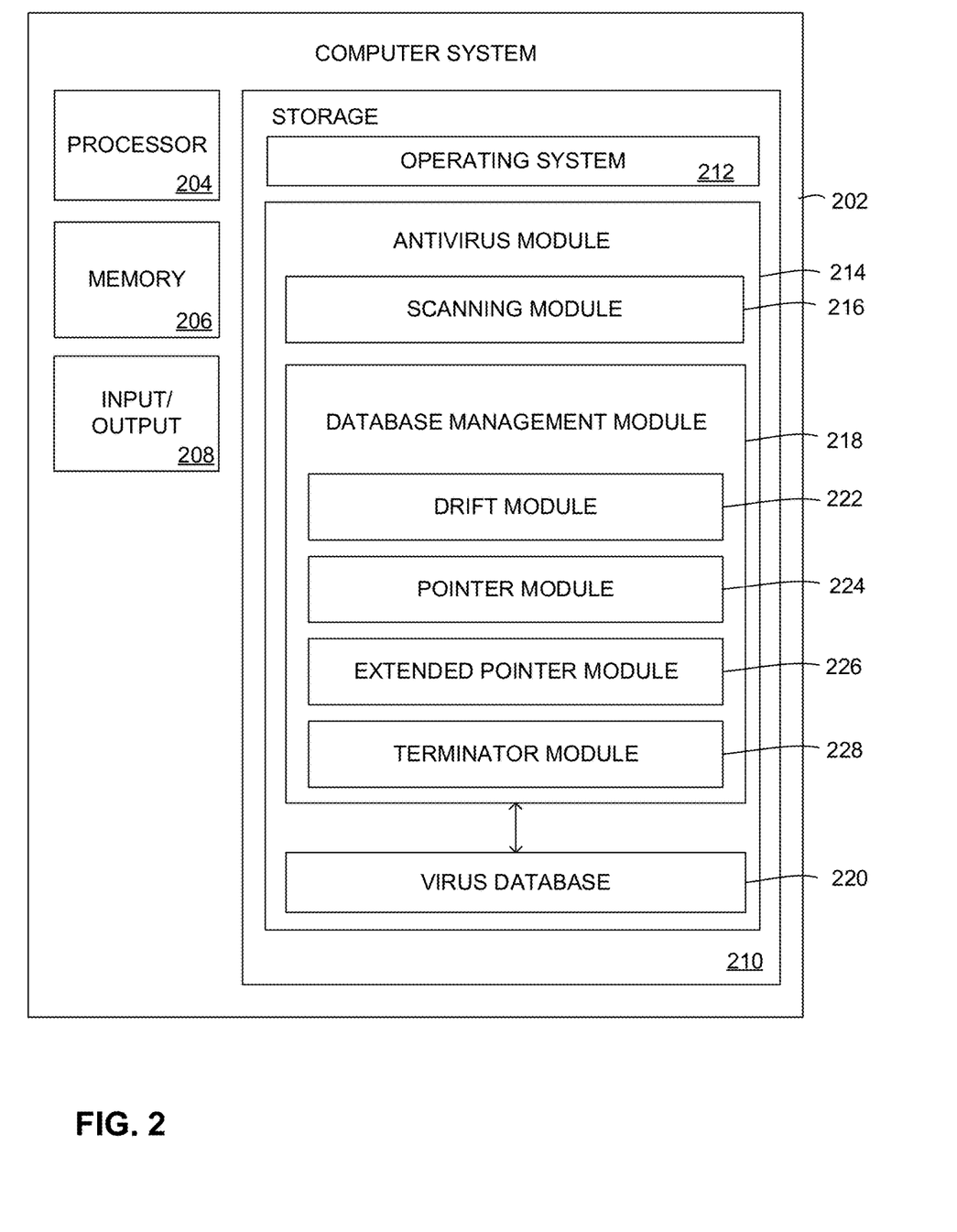
FIG. 2 shows a computer system with antivirus software and a database compressed using a plurality of compression algorithms, consistent with an example embodiment.

FIG. 2 shows a computer system with antivirus software and a database compressed using a plurality of compression algorithms, consistent with an example embodiment. Here, a computer system 202 comprises a processor 204, memory 206, and input/output 208, much as the computer of FIG. 1. Storage 210 includes operating system 212, as well as antivirus module 214. The antivirus module again contains executable code including a scanning module 216 operable to scan the computer system for viruses and other malware and a database management module 218. The database management module here is operable to read data from virus database 220, and to write data such as virus database incremental updates or an updated replacement database. The database management module can read and write compressed data to the database such as by using different compression algorithms including drift compression implemented by drift module 222, pointer compression implemented by pointer module 224, extended pointer compression implemented by extended pointer module 226, and terminator (or uncompressed) compression encoded and decoded using terminator module 228.

Drift compression in this example comprises encoding a compressed string by recognizing that the immediately preceding string differs from the current string by no more than a character at the end, with optionally one or more additional characters added after the differing character. For example, a string "Virus-A" differs from "Virus-C" only by the last character, such that the second string can be encoded or compressed by simply using a byte or word indicating drift increment by two. The string "Virus-A" differs from "Virus-CX" by the last character of the first string plus an additional character, such that the second string can be compressed by simply using a byte or word indicating drift increment by two plus the character "X".

In a further example, drift compression refers only to the immediately prior string as a reference in compressing the current string. Drift compression efficiency is therefore improved in such an example when strings in the string array are ordered alphabetically, and secondarily by string length (often called lexicographical ordering). In a further example, another defined ordering may produce similar benefits, such as sorting an array of strings first obfuscated by XORing the strings with another string to make the content difficult for a person to read.

Pointer compression uses a previous string having beginning characters identical to beginning characters of a string to be compressed, but potentially having one or more characters at the end of the previous string that are not identical. Further, the previous string in some examples need not be the immediately prior string, but can be any prior string within the addressable space of a pointer compression byte or word. For example, the string "Virus-A" differs from "Virulent" by more than the last character of the string in "Virus-A," and so the string "Virulent" cannot be compressed referencing the string "Virus-A" using the prior drift compression example. It can be compressed by using a pointer byte pointing to the "u" in "Virus-A," which is the last byte the two strings have in common, followed by the subsequent letters "lent".

In a further example, pointer compression need not reference only the immediately prior string, but can reference any string within the addressable character space of the byte used as a pointer byte, such as a string two, ten, or 128 strings prior to the string being compressed.

Extended pointer compression extends the concept of pointer compression to character strings that are more than the addressable character space of the pointer byte away from the string being compressed by using more than one byte or more than one word to address a byte location within a prior string. In a more detailed example, compressed content is decoded in reverse byte order, and the compressed string starts with the pointer byte followed immediately by the extended pointer byte. During decoding, the extended pointer byte is therefore encountered before the pointer byte, indicating that both it and the following pointer byte are used to address a character in a previous string.

Finally, literal compression is simply an indication that the string being compressed cannot be compressed using one of the other available methods, and so is copied byte for byte as the original string. In some examples, a specific character such as hexadecimal 00 is used to represent the beginning of a literal compression string, signaling that a new string in the string array is starting.

A character representing literal compression is used in this example to signify that the following text characters within the reserved address space of ASCII printable characters are not simply part of the drift, prior pointer, extended pointer, or literal compression string, but are part of a new string. Similarly, characters indicating drift compression and the amount of drift in value of the final character of the preceding string are from a reserved drift character space different from the ASCII printable character space, and pointer and extended pointer bytes or words come from a pointer address space or an extended pointer address space that is also reserved, making identification of both the beginning of a new character string and the compression type used in encoding the string straightforward whether scanned forward or backward. A more detailed example of using different address spaces for various compression methods is detailed below.

Figure 3:
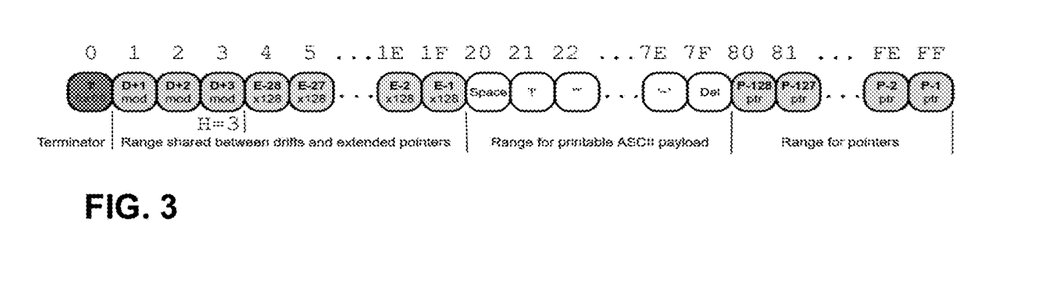
FIG. 3 shows byte spaces reserved for ASCII printable characters and various compression methods, consistent with an example embodiment.

FIG. 3 shows byte spaces reserved for ASCII printable characters and various compression methods, consistent with an example embodiment. Here, the hexadecimal byte space from 00-FF is divided into the reserved space of ASCII printable characters 20-7F that may be used as characters in the strings being compressed, and other characters used to indicate various compression or encoding methods and parameters. For example, the character 00 is reserved for terminator compression, indicating that the following ASCII text string is repeated character for character from the original uncompressed string.

In this example, the byte space from 80-FF comprises 128 different characters available to indicate both pointer compression and the number of bytes or words to count back to find the character in a preceding string through which the string being compressed is the same. The remaining ASCII printable characters after a pointer character indicate additional characters in the string being compressed that differ from the referenced preceding string.

The address space from 01-1F is in this example divided between drift compression bytes and extended pointer compression bytes, with the dividing point denoted by a variable H. H is a parameter that can be changed based on differences in character string arrays to dedicate more of the available character space to drift or to extended pointer compression as is needed to achieve the best overall rate of compression. This can be estimated by experimentally compressing portions of the string using different values for H, by compressing string arrays using different values for H, or by other experimental or numerical means such as dynamic adjustment.

Here, H is selected to have a value of three, which means that bytes 01, 02, and 03 are reserved for drift compression while bytes 04-1F are reserved for extended pointer compression. The drift compression bytes are used to indicate the amount by which the last character of the preceding string in the array should be incremented to produce the current string being compressed, and so in some examples may benefit from being a larger number such as five or more (albeit at the expense of extended pointer range).

The extended pointer address space from 04-1F represents multiples of 128, starting with 1F and counting backward toward 04 such that the maximum range of addressable space changes as new values of H are selected, changing the available highest value extended pointer values without losing the ability to address low value extended pointers. The extended pointers in this example typically work in conjunction with a following pointer in the range of 80-FF, which covers a range of 128 bytes. That is, the pointer covers increments of up to 128 bytes or words, meaning that the extended pointers need only cover multiples of 128 when used in conjunction with pointers. Such an encoding scheme enables use of an extended pointer byte and a pointer byte to reference bytes that precede the current string being encoded by a significant amount, while permitting use of only a single pointer byte to reference a byte in a preceding string that is relatively near the string being compressed.

Figure 4:
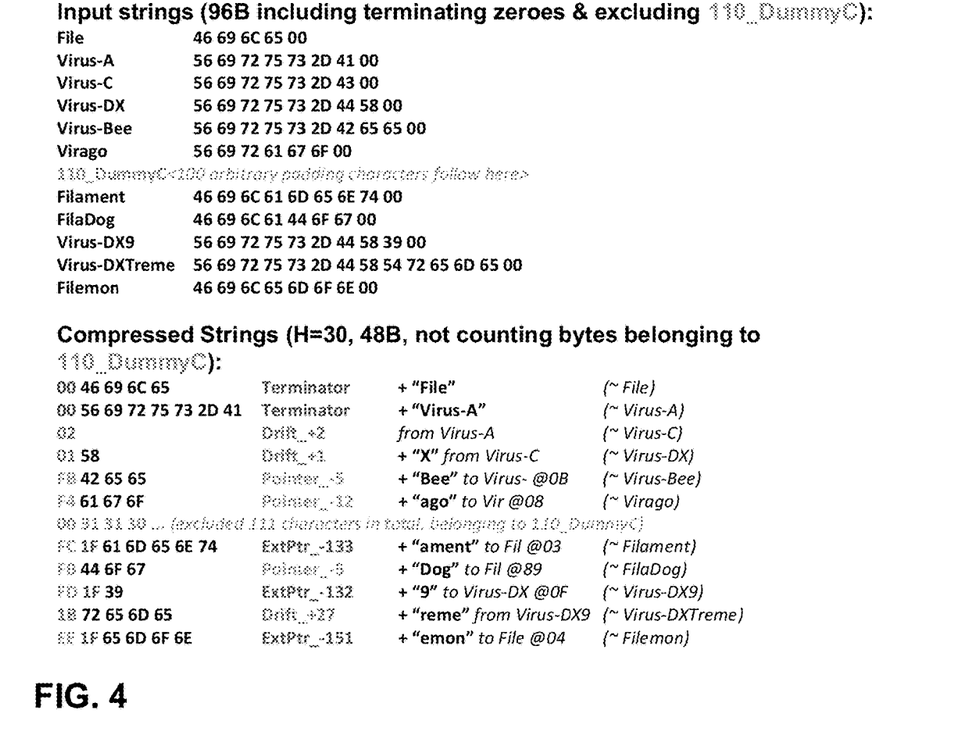
FIG. 4 shows an example of compressing an array of text strings using multiple compression methods, consistent with an example embodiment.

FIG. 4 shows an example of compressing an array of text strings using multiple compression methods, consistent with an example embodiment. Here, the first two strings "File" and "Virus-A" are encoded using literal compression, as there are no prior similar strings to be referenced in implementing the other compression methods. These two strings are therefore each represented in the compressed strings by strings starting with 00, representing literal compression, followed by the original string bytes.

The next string "Virus-C" differs from the immediately prior string only in that its last character is two characters later in the alphabet than the prior string, and is therefore two bytes later in the ASCII printable character space. It can therefore be compressed using drift compression with a drift value of two, representing incrementing the last character in the string by two. Similarly, the fourth string in the array, "Virus-DX," can be drift encoded from the previous string "Virus-C" by incrementing C by one and adding the ASCII encoded character X to the end.

The following line in the string array, "Virus-Bee," differs from the immediately prior string by more than the last character in the prior string, so is encoded using a different method. Here, a pointer points back five bytes to the second line's character "-," which means that the bytes in the first line up to and including that point (which are p"Virus-" are referenced because they are the same in the string being currently compressed. The bytes representing characters "Bee" are then added to the pointer, indicating the differing ending to the fifth line. The sixth line is similarly compressed using a pointer pointing back twelve bytes (referencing the "r" in line two of the array of compressed strings), and ending the compressed string with the remaining bytes representing "ago" to complete representation of the compressed text "Virago."

There are next 110 characters not shown, included in this example to force use of extended pointers. The seventh string of text shown occurs after this group of 110 bytes not shown, and compresses the string "Filament" using reference to the first line's character "1" in "File". To do so, a pointer extending back farther than 128 characters (which is the limit of pointer compression alone) is needed, and so extended pointer compression is used. The extended pointer byte 1F here occurs after the pointer address of FC, the values of which from FIG. 3 are added together to reflect an extended pointer counting back 133 characters from the extended pointer at the beginning of the string being compressed. This points to the "1" in "File" in the first line, to which the additional characters "ament" are added to represent the text string "Filament."

Line eight again uses a simple pointer to reference a point in a character string five bytes back, which is the "a" in "Filament", to which the bytes representing "Dog" are added to compress the text string "FilaDog." In this example, the pointer references another pointer compressed string rather than a terminator compressed string, showing another use of the pointer compression function. The remaining three lines in the example of FIG. 4 are compressed using extended pointer compression and drift function compression to encode the strings as was done with previous strings, completing compression of the array of input strings shown at the top of FIG. 4.

The tenth string shown in this example contains the text string "Virus-DXTreme," which could be encoded by reference to the immediately preceding string "Virus-DX9" or the string "Virus-DX" on the fourth line. Compression is selected for each string based on which algorithm produces the best compression. If two or more algorithms compress the string to the same length compressed sequence, the algorithm requiring the least computation or that is the least complex is selected, minimizing computational cost to decompress the string. Using the four compression algorithms presented in this example, the order of compression priority for ties based on computational complexity is literal, drift, and pointer (extended pointer is most computationally complex and will therefore never be chosen in event of a tie). Because extended pointer compression and drift compression of the string both result in compressed string lengths of five bytes for the tenth string shown in FIG. 4, the least computationally complex compression method is chosen (methods in order of increasing complexity being Literal, Drift, Pointer, and Extended Pointer), and drift encoding is used.

Because the compression examples presented here can look back a limited distance, here defined by the reach of an extended pointer/pointer byte pair, a buffer large enough to maintain all or a substantial portion of the prior strings in the array that can be referenced by an available compression algorithm is maintained. The buffer in some examples is a round buffer, describing each byte in the accessible window with its position in the underlying string and with the character at this byte position. This method speeds up compression both by buffering this information in memory and by limiting the scope of compression options to explore to those that used buffered strings as a reference (such as by using branch-and-bound or other suitable methods).

Figure 5:
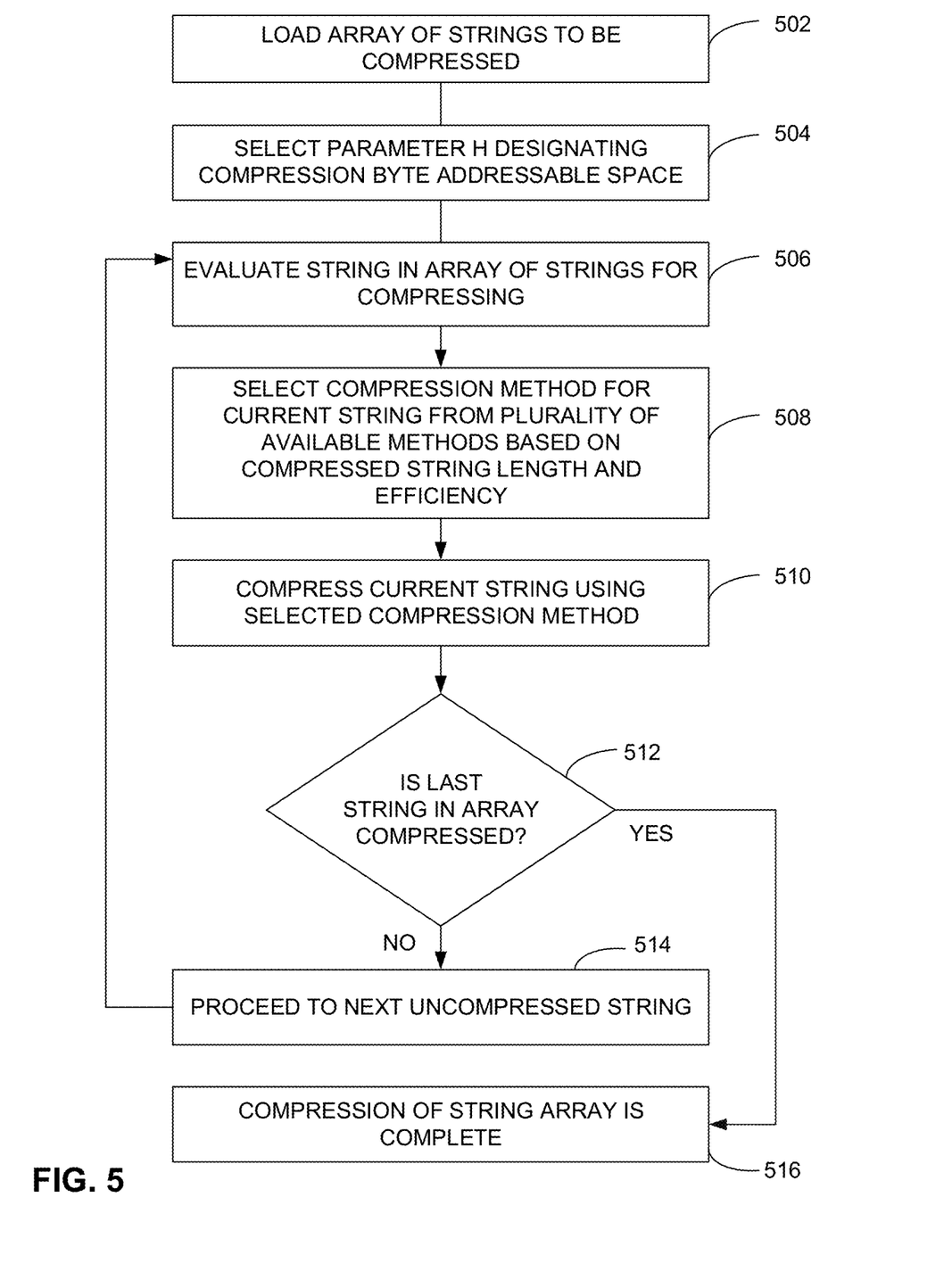
FIG. 5 is a flowchart of a method of compressing an array of strings having similarities, consistent with an example embodiment.

FIG. 5 is a flowchart of a method of compressing an array of strings having similarities, consistent with an example embodiment. An array of strings to be compressed is loaded at 502, such as a list of text names of viruses in a virus database. A parameter H is selected at 504, which is used in allocating available byte space to different compression methods from among the available compression methods, as is shown in FIG. 3. In a further example, a drift function or other parameters are also defined at 504.

At 506, the first string to be compressed is evaluated for compressing, such as by applying each applicable available compression method to the string. At 508, the best compression method from the plurality of available compression methods is selected, based first on selecting the compression method that produces the shortest compressed string, and secondarily, in the event two or more compression methods are each operable to produce the shortest string, on which compression method is the simplest or most computationally efficient.

The current string being compressed is then compressed using the selected compression method at 510. If the string that was compressed at 510 is determined at 512 to be the last string in the array of strings to be compressed, the process is complete at 516. If one or more strings in the array of strings are still not compressed, the process proceeds to the next uncompressed string at 514, and the next uncompressed string is evaluated at 506 and compression method for that string is newly selected before compression. This process repeats until all strings in the string array have been processed or compressed, at which point the process ends at 516.

The flowchart of FIG. 5 illustrates how compression is selected from among two or more different compression methods on a per-string basis, using the method for each string that results in the best result for that string. By dividing the byte space into different spaces, such as a first dedicated space for ASCII printable characters, and different byte spaces for each of the different available compression methods, bytes in the compressed string can be used to represent both the type of compression used for each string as well as parameters for compression such as a pointer value or drift value used in compressing the string.

This method results in fast and efficient compression of a virus name database or other text string array such as another index, dictionary, or directory, and enables strings within the array to be decompressed without decoding the entire array. Similar methods can be used for other strings byte spaces, word sizes, etc., and provide advantages similar to those found here. Although some computerized devices such as a client computer, server, and others have been illustrated in the examples above, these devices in other embodiments may take other forms or have other features, such as those described in conjunction with the example computer of FIG. 6.

Figure 6:
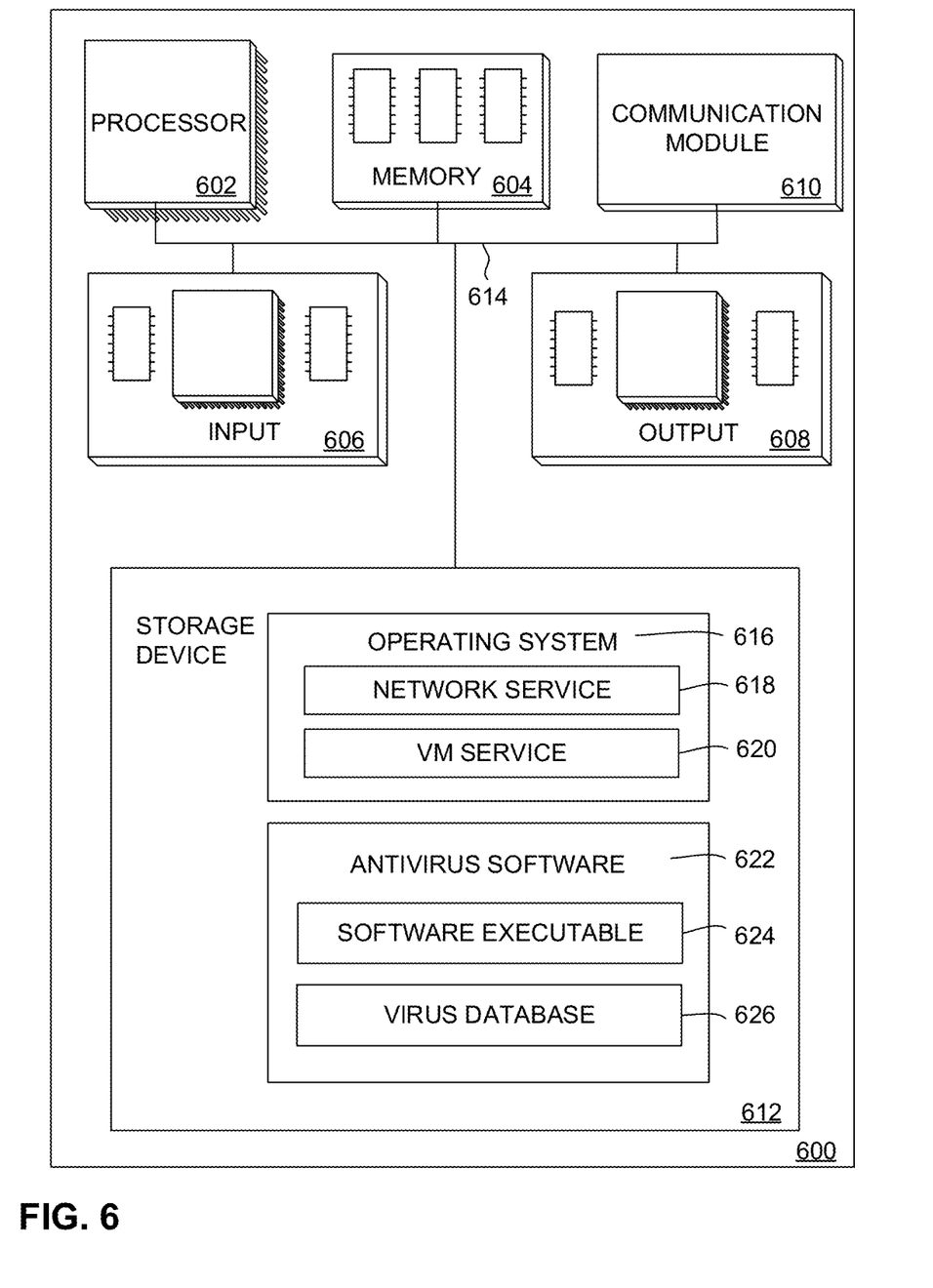
FIG. 6 is a computerized computer system comprising antivirus software with a compressed virus database, consistent with an example embodiment.

FIG. 6 is a computerized computer system comprising antivirus software with a compressed virus database, consistent with an example embodiment. FIG. 6 illustrates only one particular example of computing device 600, and other computing devices 600 may be used in other embodiments. Although computing device 600 is shown as a standalone computing device, computing device 600 may be any component or system that includes one or more processors or another suitable computing environment for executing software instructions in other examples, and need not include all of the elements shown here.

As shown in the specific example of FIG. 6, computing device 600 includes one or more processors 602, memory 604, one or more input devices 606, one or more output devices 608, one or more communication modules 610, and one or more storage devices 612. Computing device 600, in one example, further includes an operating system 616 executable by computing device 600. The operating system includes in various examples services such as a network service 618 and a virtual machine service 620 such as a virtual server. One or more applications, such as web browser 622 are also stored on storage device 612, and are executable by computing device 600.

Each of components 602, 604, 606, 608, 610, and 612 may be interconnected (physically, communicatively, and/or operatively) for inter-component communications, such as via one or more communications channels 614. In some examples, communication channels 614 include a system bus, network connection, inter-processor communication network, or any other channel for communicating data. Applications such as antivirus software 622 and operating system 616 may also communicate information with one another as well as with other components in computing device 600.

Processors 602, in one example, are configured to implement functionality and/or process instructions for execution within computing device 600. For example, processors 602 may be capable of processing instructions stored in storage device 612 or memory 604. Examples of processors 602 include any one or more of a microprocessor, a controller, a digital signal processor (DSP), an application specific integrated circuit (ASIC), a field-programmable gate array (FPGA), or similar discrete or integrated logic circuitry.

One or more storage devices 612 may be configured to store information within computing device 600 during operation. Storage device 612, in some examples, is known as a computer-readable storage medium. In some examples, storage device 612 comprises temporary memory, meaning that a primary purpose of storage device 612 is not long-term storage. Storage device 612 in some examples is a volatile memory, meaning that storage device 612 does not maintain stored contents when computing device 600 is turned off. In other examples, data is loaded from storage device 612 into memory 604 during operation. Examples of volatile memories include random access memories (RAM), dynamic random access memories (DRAM), static random access memories (SRAM), and other forms of volatile memories known in the art. In some examples, storage device 612 is used to store program instructions for execution by processors 602. Storage device 612 and memory 604, in various examples, are used by software or applications running on computing device 600 such as antivirus software 622 to temporarily store information during program execution.

Storage device 612, in some examples, includes one or more computer-readable storage media that may be configured to store larger amounts of information than volatile memory. Storage device 612 may further be configured for long-term storage of information. In some examples, storage devices 612 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 600, in some examples, also includes one or more communication modules 610. Computing device 600 in one example uses communication module 610 to communicate with external devices via one or more networks, such as one or more wireless networks. Communication module 610 may be a network interface card, such as an Ethernet card, an optical transceiver, a radio frequency transceiver, or any other type of device that can send and/or receive information. Other examples of such network interfaces include Bluetooth, LTE, WiFi, Near-Field Communications (NFC), and Universal Serial Bus (USB). In some examples, computing device 600 uses communication module 610 to wirelessly communicate with an external device such as via public network 120 of FIG. 1.

Computing device 600 also includes in one example one or more input devices 606. Input device 606, in some examples, is configured to receive input from a user through tactile, audio, or video input. Examples of input device 606 include a touchscreen display, a mouse, a keyboard, a voice responsive system, video camera, microphone or any other type of device for detecting input from a user.

One or more output devices 608 may also be included in computing device 600. Output device 608, in some examples, is configured to provide output to a user using tactile, audio, or video stimuli. Output device 608, in one example, includes a display, a sound card, a video graphics adapter card, or any other type of device for converting a signal into an appropriate form understandable to humans or machines. Additional examples of output device 608 include a speaker, a light-emitting diode (LED) display, a liquid crystal display (LCD), or any other type of device that can generate output to a user.

Computing device 600 may include operating system 616. Operating system 616, in some examples, controls the operation of components of computing device 600, and provides an interface from various applications such as antivirus software 622 to components of computing device 600. For example, operating system 616, in one example, facilitates the communication of various applications such as antivirus software 622 with processors 602, communication unit 610, storage device 612, input device 606, and output device 608. Applications such as antivirus software 622 may include additional program instructions and/or data that are executable by computing device 600. As one example, antivirus software 622 includes a software executable 624 operable to provide functionality such managing compressed antivirus signature database 626 using methods such as those described above. These and other program instructions or modules may include instructions that cause computing device 600 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of compressing a string array comprising strings with similarity, comprising:
    receiving a string from the array of strings to be compressed, the string comprising text characters represented by a first range of values within a word;
    select a string compression method from among a plurality of available compression methods, based on at least which of the available compression method yields the shortest compressed string, wherein the plurality of available compression methods comprises drift compression and wherein drift compression comprises compressing a string by recording a number by which the last word in an immediately preceding string is changed to produce the string being compressed;
    compressing the string using the selected string compression method, the compressed string comprising one or more words in a second range of values dedicated to compression and not overlapping with the first range of values, wherein compressing by drift compression further comprises a threshold dividing at least a portion of the second range of values between words available for drift compression encoding and words available for another of the plurality of available compression methods; and
    repeating the receiving, compressing, and selecting for a plurality of additional strings in the string array.

2. The method of compressing a string array of claim 1, wherein drift compression further comprises adding one or more words to the recorded difference, the one or more added words comprising words in the string being compressed that are in addition to and follow the words in the immediately preceding string.

3. The method of compressing a string array of claim 1, wherein the recorded difference is encoded using a defined drift function.

4. The method of compressing a string array of claim 1, wherein the available compression methods comprise pointer compression, which comprises encoding a string by recording a number of words to step back to find the end of a preceding string segment, to which one or more words are add to the end to produce the string being compressed.

5. The method of compressing a string array of claim 4, wherein a pointer compression word indicates the number of words of a preceding string to remove before adding one or more words to the end of the preceding string to produce the string being compressed.

6. The method of compressing a string array of claim 1, wherein the available compression methods comprise extended pointer compression, which comprises encoding a string by recording a number of words to step back to find the end of a preceding string segment using two or more pointer compression words, to which one or more words are appended to the end to produce the string being compressed.

7. The method of compressing a string array of claim 6, wherein the two or more pointer compression words comprise a pointer compression word and an extended pointer compression word, the extended pointer compression words incremental value derived from the available pointer compression word value range.

8. The method of compressing a string array of claim 1, wherein the available compression methods comprise a terminator compression word and the full character string being compressed.

9. The method of compressing a string array of claim 1, wherein one or more characters at the beginning of each of the plurality of compressed strings indicates which of the plurality of available compression methods was used to compress that string.

10. The method of compressing a string array of claim 1, wherein the string array comprises a part of an antivirus signature database.

11. The method of compressing a string array of claim 1, wherein select a string compression method from among a plurality of available compression methods based on at least which of the available compression method yields the shortest compressed string comprises compressing the string with reference to a window of preceding strings within an addressable window of at least one of the plurality of available string compression methods.

12. The method of compressing a string array of claim 11, wherein the window of preceding strings within an addressable window of at least one of the plurality of available string compression methods is buffered in a format that does not require full decompression of the preceding strings to reference the strings in determining which of the available compression method yields the shortest compressed string.

13. The method of compressing a string array of claim 1, wherein a compressed string can be read without decompressing the entire compressed array of strings.

14. The method of compressing a string array of claim 1, further comprising sorting at least a portion of the strings in the string array lexicographically before compression.

* * * * *